US012447270B2

(12) United States Patent
Othel-Jacobsen

(10) Patent No.: US 12,447,270 B2
(45) Date of Patent: Oct. 21, 2025

(54) MINIATURIZED PATCH PUMP SYSTEM

(71) Applicant: UNOMEDICAL A/S, Lejre (DK)

(72) Inventor: Erik Othel-Jacobsen, Snekkersten (DK)

(73) Assignee: Unomedical A/S, Lejre (DK)

( * ) Notice: Subject to any disclaimer, the term of this patent is extended or adjusted under 35 U.S.C. 154(b) by 731 days.

(21) Appl. No.: 17/727,104

(22) Filed: Apr. 22, 2022

(65) Prior Publication Data

US 2022/0339348 A1    Oct. 27, 2022

Related U.S. Application Data

(63) Continuation of application No. PCT/EP2022/060652, filed on Apr. 22, 2022.

(60) Provisional application No. 63/178,816, filed on Apr. 23, 2021.

(51) Int. Cl.
*A61M 5/142* (2006.01)
*A61M 5/145* (2006.01)
*A61M 39/24* (2006.01)
*A61M 5/32* (2006.01)

(52) U.S. Cl.
CPC .... *A61M 5/14248* (2013.01); *A61M 5/14566* (2013.01); *A61M 39/24* (2013.01); *A61M 2005/3289* (2013.01); *A61M 2205/0216* (2013.01); *A61M 2205/125* (2013.01)

(58) Field of Classification Search
CPC .......... A61M 5/14248; A61M 5/14244; A61M 2005/14252; A61M 2005/158; A61M 2005/3289
See application file for complete search history.

(56) References Cited

U.S. PATENT DOCUMENTS

| 8,105,280 B2 * | 1/2012 | Iddan ................ A61M 5/16809 |
| | | 604/131 |
| 11,033,675 B2 | 6/2021 | Hirafuji |
| 11,040,135 B2 | 6/2021 | Clemente et al. |
| 11,058,814 B2 | 7/2021 | Li et al. |
| 11,135,354 B2 | 10/2021 | DiPerna |
| 11,135,356 B2 | 10/2021 | Hanson et al. |

(Continued)

FOREIGN PATENT DOCUMENTS

| AU | 2019284140 B2 | 2/2021 | |
| CN | 102202719 A * | 9/2011 | ........ A61M 39/0208 |

(Continued)

OTHER PUBLICATIONS

CN 102202719 A machine translation (Year: 2011).*

(Continued)

*Primary Examiner* — Laura A Bouchelle
(74) *Attorney, Agent, or Firm* — TAFT STETTINIUS HOLLISTER LLP; Ryan O. White; Derek B. Lavender

(57) ABSTRACT

A patch pump system that has an electronic assembly, a reservoir for containing a fluid, and an inserter for selectively transitioning a needle from a retracted position to an extended position. The inserter provides a fluid channel that selectively fluidly couples a distal tip of the needle to the reservoir. The needle is at least partially deformed as it transitions from the retracted position to the extended position and the electronic assembly selectively distributes fluid from the reservoir to the distal tip of the needle.

13 Claims, 10 Drawing Sheets

(56) References Cited

U.S. PATENT DOCUMENTS

| | | |
|---|---|---|
| 11,173,242 B2 | 11/2021 | Lanigan et al. |
| 11,213,624 B2 | 1/2022 | McCullough et al. |
| 11,229,739 B2 | 1/2022 | Reeves |
| 11,246,977 B2 | 2/2022 | Oakes et al. |
| 11,253,653 B2 | 2/2022 | Hostettler et al. |
| 11,266,823 B2 | 3/2022 | Yavorsky et al. |
| 11,305,067 B2 | 4/2022 | Bar-El et al. |
| 11,318,292 B2 | 5/2022 | Zvezdin et al. |
| 11,350,862 B2 | 6/2022 | Halac et al. |
| 11,399,754 B2 | 8/2022 | Jager |
| 11,406,754 B2 | 8/2022 | Streit et al. |
| 11,464,899 B2 | 10/2022 | Searle et al. |
| 11,464,900 B2 | 10/2022 | McCullough et al. |
| 11,464,902 B1 | 10/2022 | Schiff et al. |
| 11,471,593 B2 | 10/2022 | Barmaimon et al. |
| 11,478,583 B2 | 10/2022 | Hooven et al. |
| 11,484,648 B2 | 11/2022 | Moberg et al. |
| 11,534,543 B2 | 12/2022 | Kamen et al. |
| 11,534,547 B2 | 12/2022 | Groszmann et al. |
| 11,690,952 B2 | 7/2023 | Kamen et al. |
| 11,701,300 B2 | 7/2023 | Lanier, Jr. et al. |
| 11,702,233 B2 | 7/2023 | Grant et al. |
| 11,706,876 B2 | 7/2023 | Halac et al. |
| 11,712,513 B2 | 8/2023 | Gray et al. |
| 11,717,609 B2 | 8/2023 | Kamen et al. |
| 11,738,137 B2 | 8/2023 | Kim et al. |
| 11,738,138 B2 | 8/2023 | DeStefano et al. |
| 11,738,139 B2 | 8/2023 | Gray |
| 11,744,937 B2 | 9/2023 | Searle et al. |
| 11,752,258 B2 | 9/2023 | Damestani et al. |
| 11,759,564 B2 | 9/2023 | Streit et al. |
| 11,771,822 B1 | 10/2023 | Imboden |
| 11,771,824 B2 | 10/2023 | Pizzochero et al. |
| 11,779,697 B2 | 10/2023 | Shor et al. |
| 11,786,173 B2 | 10/2023 | Huddleston et al. |
| 11,786,651 B2 | 10/2023 | Kamen et al. |
| 11,813,426 B2 | 11/2023 | Forster et al. |
| 11,813,427 B2 | 11/2023 | Kamen et al. |
| 11,819,673 B2 | 11/2023 | Yudelevich et al. |
| 11,904,134 B2 | 2/2024 | Gray |
| 11,918,784 B2 | 3/2024 | Kim et al. |
| 11,964,126 B2 | 4/2024 | Lanier, Jr. et al. |
| 11,964,128 B2 | 4/2024 | Kim et al. |
| 11,980,737 B2 | 5/2024 | Streit et al. |
| 11,980,738 B1 | 5/2024 | Lipman et al. |
| 11,980,739 B2 | 5/2024 | Pizzochero et al. |
| 11,986,624 B2 | 5/2024 | McCullough et al. |
| 11,992,650 B2 | 5/2024 | Kamen et al. |
| 11,998,328 B2 | 6/2024 | Jager |
| 11,998,720 B2 | 6/2024 | Bin et al. |
| 12,011,560 B2 | 6/2024 | Netzel et al. |
| 12,012,241 B2 | 6/2024 | Lanigan et al. |
| 2006/0013710 A1 | 1/2006 | Lee |
| 2008/0312600 A1* | 12/2008 | Krulevitch ............ A61M 5/158 604/181 |
| 2009/0118592 A1* | 5/2009 | Klitgaard ............ A61B 5/6849 600/300 |
| 2014/0155819 A1* | 6/2014 | Amirouche ........... A61M 5/158 604/82 |
| 2018/0207356 A1* | 7/2018 | Joseph ................. A61M 5/158 |
| 2018/0333533 A1 | 11/2018 | Levine et al. |
| 2021/0162117 A1 | 6/2021 | Michaud et al. |
| 2021/0178085 A1 | 6/2021 | Chowdhury |
| 2021/0196883 A1 | 7/2021 | Fabien |
| 2021/0196892 A1 | 7/2021 | Dasbach et al. |
| 2021/0213192 A1 | 7/2021 | Chappel et al. |
| 2021/0228799 A1 | 7/2021 | Streit et al. |
| 2021/0308367 A1 | 10/2021 | Searle et al. |
| 2021/0316066 A1 | 10/2021 | Kim et al. |
| 2021/0330878 A9 | 10/2021 | Margairaz |
| 2021/0338924 A1 | 11/2021 | Streit et al. |
| 2021/0346601 A1 | 11/2021 | Lee et al. |
| 2021/0353911 A1 | 11/2021 | Cole |
| 2021/0361883 A1 | 11/2021 | Yudelevich et al. |
| 2021/0369983 A1 | 12/2021 | Chowdhury |
| 2021/0379293 A1 | 12/2021 | Nazzaro et al. |
| 2021/0393871 A1 | 12/2021 | Streit et al. |
| 2021/0393872 A1 | 12/2021 | Streit et al. |
| 2021/0393873 A1 | 12/2021 | Streit et al. |
| 2022/0047815 A1 | 2/2022 | Jazayeri et al. |
| 2022/0054741 A1 | 2/2022 | Laurence et al. |
| 2022/0062537 A1 | 3/2022 | Streit et al. |
| 2022/0062550 A1 | 3/2022 | Nazzaro et al. |
| 2022/0105267 A1 | 4/2022 | Cardinali et al. |
| 2022/0118177 A1 | 4/2022 | Burgess et al. |
| 2022/0133993 A1 | 5/2022 | Smith |
| 2022/0143305 A1 | 5/2022 | Smith et al. |
| 2022/0168500 A1 | 6/2022 | McCaffrey |
| 2022/0168501 A1 | 6/2022 | Cole |
| 2022/0175616 A1 | 6/2022 | Bianchi et al. |
| 2022/0193332 A1 | 6/2022 | Fabien |
| 2022/0218900 A1 | 7/2022 | Gibson et al. |
| 2022/0241239 A1 | 8/2022 | Lucera et al. |
| 2022/0241497 A1 | 8/2022 | Burren et al. |
| 2022/0296160 A1 | 9/2022 | Hooven et al. |
| 2022/0313902 A1 | 10/2022 | Gonnelli et al. |
| 2022/0362458 A1 | 11/2022 | Schrul et al. |
| 2022/0379019 A1 | 12/2022 | Lanigan et al. |
| 2023/0211075 A1 | 7/2023 | Fiechter et al. |
| 2023/0211081 A1 | 7/2023 | Kim et al. |
| 2023/0211082 A1 | 7/2023 | Kuehn et al. |
| 2023/0226271 A1 | 7/2023 | Lanigan et al. |
| 2023/0226273 A1 | 7/2023 | Kamen et al. |
| 2023/0226274 A1 | 7/2023 | Kamen et al. |
| 2023/0233756 A1 | 7/2023 | Lanier et al. |
| 2023/0241321 A1 | 8/2023 | Olivas et al. |
| 2023/0256168 A1 | 8/2023 | Uddin et al. |
| 2023/0270934 A1 | 8/2023 | DeStefano et al. |
| 2023/0285236 A1 | 9/2023 | Liu et al. |
| 2023/0310761 A1 | 10/2023 | Chowdhury |
| 2023/0330327 A1 | 10/2023 | Imran |
| 2023/0330328 A1 | 10/2023 | Moberg et al. |
| 2023/0355877 A1 | 11/2023 | McCullough et al. |
| 2023/0364339 A1 | 11/2023 | Bin et al. |
| 2023/0372606 A1 | 11/2023 | Kamen et al. |
| 2023/0381405 A1 | 11/2023 | Bussiere et al. |
| 2023/0381407 A1 | 11/2023 | Yu et al. |
| 2023/0381408 A1 | 11/2023 | Liu et al. |
| 2023/0381409 A1 | 11/2023 | Lee et al. |
| 2023/0404850 A1 | 12/2023 | Chou et al. |
| 2024/0001028 A1 | 1/2024 | Yodfat et al. |
| 2024/0042128 A1 | 2/2024 | Bang et al. |
| 2024/0050648 A1 | 2/2024 | Yang |
| 2024/0057938 A1 | 2/2024 | Huddleston et al. |
| 2024/0058525 A1 | 2/2024 | Yang |
| 2024/0066210 A1 | 2/2024 | Yang |
| 2024/0066211 A1 | 2/2024 | Yang |
| 2024/0066212 A1 | 2/2024 | Yang |
| 2024/0066214 A1 | 2/2024 | Kamen et al. |
| 2024/0066222 A1 | 2/2024 | Yang |
| 2024/0082491 A1 | 3/2024 | Yang |
| 2024/0108801 A1 | 4/2024 | Gonnelli et al. |
| 2024/0115799 A1 | 4/2024 | Yang |
| 2024/0115800 A1 | 4/2024 | Yang |
| 2024/0139411 A1 | 5/2024 | Yang |
| 2024/0165331 A1 | 5/2024 | Kim et al. |
| 2024/0165388 A1 | 5/2024 | Damiano et al. |
| 2024/0195058 A1 | 6/2024 | Blumberg, Jr. |
| 2024/0197984 A1 | 6/2024 | Murphy et al. |

FOREIGN PATENT DOCUMENTS

| | | |
|---|---|---|
| EP | 3832661 A1 | 6/2021 |
| EP | 3609556 B1 | 7/2021 |
| EP | 3437676 B1 | 8/2021 |
| EP | 3906951 A1 | 11/2021 |
| EP | 2995330 B1 | 12/2021 |
| EP | 3936173 A1 | 1/2022 |
| EP | 3964249 A1 | 3/2022 |
| EP | 3967338 A1 | 3/2022 |
| EP | 3616736 B1 | 4/2022 |
| EP | 3760253 B1 | 4/2022 |
| EP | 3714922 B1 | 5/2022 |
| EP | 3756704 B1 | 5/2022 |

(56) References Cited

FOREIGN PATENT DOCUMENTS

| | | |
|---|---|---|
| EP | 3998095 A1 | 5/2022 |
| EP | 2611478 B1 | 8/2022 |
| EP | 3027246 B1 | 8/2022 |
| EP | 3470100 B1 | 8/2022 |
| EP | 4052744 A1 | 9/2022 |
| EP | 4062957 A1 | 9/2022 |
| EP | 3256189 B1 | 10/2022 |
| EP | 4084843 A1 | 11/2022 |
| EP | 4085941 A1 | 11/2022 |
| EP | 4085942 A1 | 11/2022 |
| EP | 4209235 A1 | 7/2023 |
| EP | 4210783 A1 | 7/2023 |
| EP | 3727526 B1 | 8/2023 |
| EP | 4221781 A2 | 8/2023 |
| EP | 3035978 B1 | 9/2023 |
| EP | 4241805 A1 | 9/2023 |
| EP | 4255528 A2 | 10/2023 |
| EP | 3691716 B1 | 11/2023 |
| EP | 4274631 A1 | 11/2023 |
| EP | 4274632 A1 | 11/2023 |
| EP | 4274633 A1 | 11/2023 |
| EP | 4274634 A1 | 11/2023 |
| EP | 4274635 A1 | 11/2023 |
| EP | 4274637 A1 | 11/2023 |
| EP | 4274638 A1 | 11/2023 |
| EP | 4274639 A1 | 11/2023 |
| EP | 4274642 A1 | 11/2023 |
| EP | 4274643 A1 | 11/2023 |
| EP | 4275715 A1 | 11/2023 |
| EP | 3375470 B1 | 1/2024 |
| EP | 3634357 B1 | 1/2024 |
| EP | 3998095 B1 | 1/2024 |
| EP | 3878492 B1 | 2/2024 |
| EP | 4337284 A1 | 3/2024 |
| EP | 3151882 B1 | 4/2024 |
| EP | 3648816 B1 | 4/2024 |
| EP | 3664862 B1 | 4/2024 |
| EP | 4364766 A2 | 5/2024 |
| EP | 3474927 B1 | 6/2024 |
| EP | 3700416 B1 | 6/2024 |
| EP | 3928687 B1 | 6/2024 |
| EP | 4385551 A2 | 6/2024 |
| EP | 4389173 A2 | 6/2024 |
| WO | 2013016376 A2 | 1/2013 |
| WO | 2022148207 A1 | 7/2022 |
| WO | 2024027849 A1 | 2/2024 |

OTHER PUBLICATIONS

European Patent Office; Notification of Transmittal of the ISR and the WO of the ISA, Or The Declaration; Date of Mailing: Aug. 16, 2022; pp. 1.

European Patent Office; International Search Report of corresponding application PCT/EP2022/060652; Date of mailing: Aug. 16, 2022; pp. 2.

European Patent Office; From the International Searching Authority; Written Opinion of the ISA of corresponding application PCT/EP2022/060652; pp. 1-3; Date of Mailing: Aug. 16, 2022.

* cited by examiner

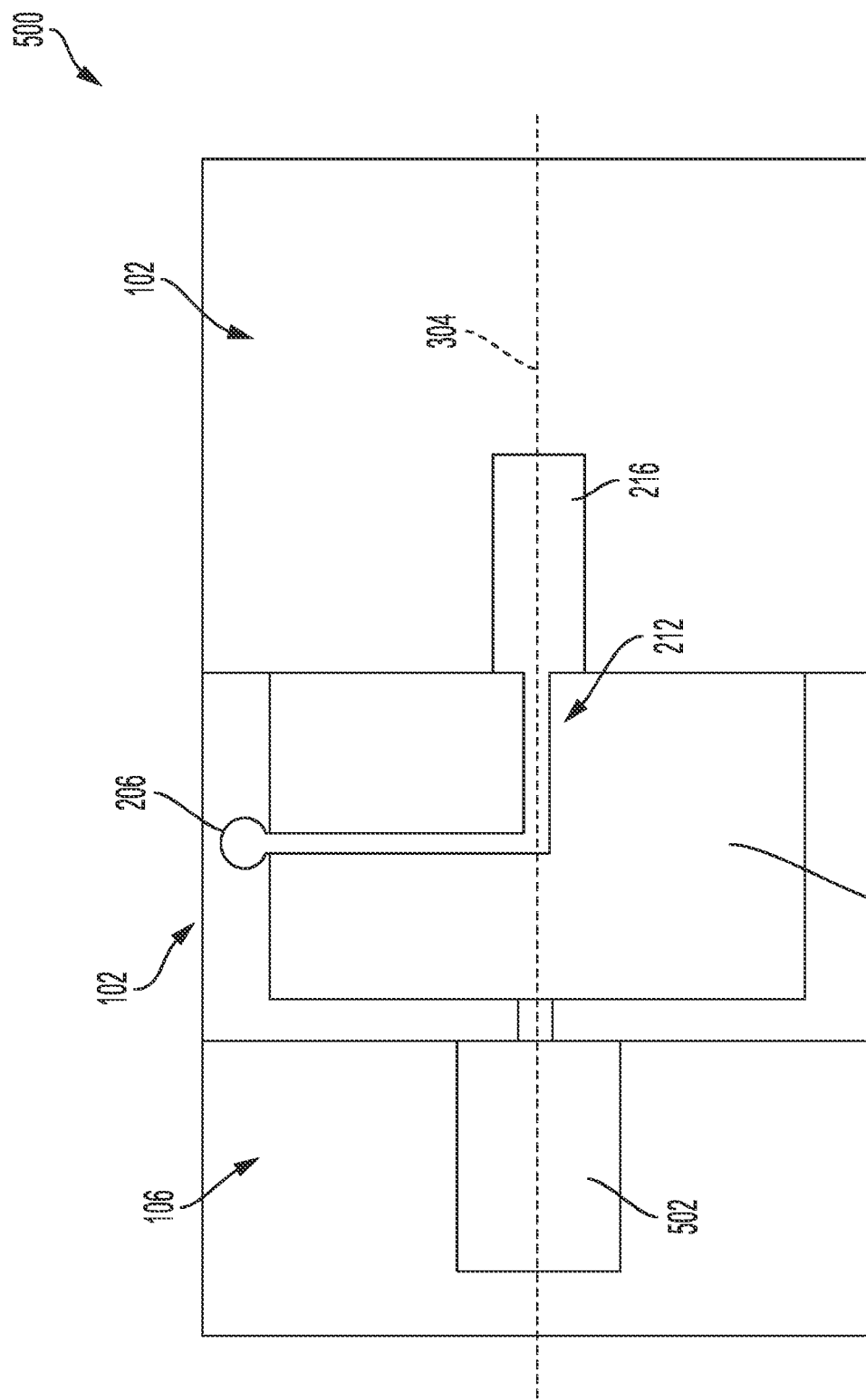

MINIATURIZED PATCH PUMP SYSTEM

CROSS-REFERENCE TO RELATED DISCLOSURES

The present disclosure is a continuation of International Application No. PCT/EP2022/060652 filed on Apr. 22, 2022 and claims the benefit of U.S. Provisional Application No. 63/178,816 filed on Apr. 23, 2021, the contents of which are incorporated herein in entirety.

FIELD OF THE DISCLOSURE

The present disclosure relates to a patch system for delivering a fluid subcutaneously to a user, and more specifically to a miniaturized patch system that has a needle insertion mechanism.

BACKGROUND OF THE DISCLOSURE

Pump systems have been developed to provide a user with prolonged subcutaneous infusion of a fluid. Often, the pump system pumps fluid from a reservoir into tubing leading to an infusion set having a needle or cannula positioned subcutaneously in a user. The pump system may have corresponding electronics or mechanical components to provide a metered delivery of the fluid to the user. Often, the pump and reservoir are separated from the infusion set and the fluid from the reservoir is pumped to the infusion set through tubing.

SUMMARY

One embodiment is a patch pump system that has an electronic assembly, a reservoir for containing a fluid, and an inserter for selectively transitioning a needle from a retracted position to an extended position, the inserter providing a fluid channel that selectively fluidly couples a distal tip of the needle to the reservoir. In this embodiment, the needle is at least partially deformed as it transitions from the retracted position to the extended position and the electronic assembly selectively distributes fluid from the reservoir to the distal tip of the needle.

In one example of this embodiment, the reservoir has a base surface configured to be coupled to a user and the base surface defines a base plane. The inserter has an inner part that rotates about a rotation axis that is substantially parallel to the base plane to transition the needle from the retracted position to the extended position. One part of this example has a filter positioned between the reservoir and the distal tip of the needle. However, other parts of this example do not have a filter at all.

In examples having a filter, the filter at least partially filters one or more of phenol and meta-cresol residuals from fluid passing there through.

In one example of this embodiment, the patch system is less than forty-nine millimeters wide by thirty-nine millimeters deep and twelve millimeters thick.

In another example of this embodiment, the patch system is less than about forty-one millimeters wide by about thirty-six millimeters deep and about ten millimeters thick.

Another example of this embodiment includes a valve positioned along the fluid channel between the distal tip of the needle and the reservoir. In part of this example, the valve is a one-way valve allowing fluid to flow through the fluid channel from the reservoir to the distal end of the needle.

Yet another example of this embodiment has a filter positioned in-line with the fluid channel between the reservoir and the distal tip of the needle and a first one-way valve positioned along the fluid channel between the filter and the reservoir. An additional example may add a second one-way valve positioned along the fluid channel between the distal end of the needle and the filter.

In another example of this embodiment, the reservoir is removable from the electronic assembly and inserter.

In another example of this embodiment, the electronic assembly selectively transitions the needle between the retracted position to the extended position.

In another example of this embodiment, the electronic assembly selectively controls a motor to rotate the inserter to transition the needle between the retracted position to the extended position. As part of this example, the electronic assembly selectively controls an extension length of the needle. In another part of this example, the electronic assembly selectively controls an insertion angle of the needle.

Yet another example of this embodiment includes an inner part configured to selectively transition the needle from the retracted position to the extended position and an insertion angle component. In this example, as the inner part transitions from the retracted position to the extended position, the needle is at least partially deformed by the insertion angle component. In one part of this example, the needle is elastically deformed to fit within the inserter in the retracted position and deflects through contact with the insertion angle component as the needle transitions from the retracted position to the extended position. In another part of this example, the needle maintains a substantially linear configuration as it extends outside of the base.

Another embodiment of this disclosure is a patch pump system that has an electronic assembly, a reservoir for containing a fluid, and an inserter for selectively transitioning a needle from a retracted position to an extended position, the inserter providing a fluid channel that selectively fluidly couples a distal tip of the needle to the reservoir. In this embodiment, the patch pump system is less than forty-nine millimeters wide by thirty-nine millimeters deep and twelve millimeters thick.

In one example of this embodiment, the reservoir has a base surface configured to be coupled to a user, the base surface defining a base plane. The inserter extends the needle at least about four millimeters past the base plane in the extended position. In part of this example, the patch system is no greater than about forty-one millimeters wide by about thirty-six millimeters deep and about ten millimeters thick.

In another example of this embodiment, the reservoir is removable from the electronic assembly and inserter.

Yet another example of this embodiment has an inner part of the inserter configured to selectively transition the needle from the retracted position to the extended position and an insertion angle component. In this example as the inner part transitions from the retracted position to the extended position, the needle is at least partially deformed by the insertion angle component. In part of this example, the needle is elastically deformed to fit within the inserter in the retracted position and deflect through contact with the insertion angle component as the needle transitions from the retracted position to the extended position. In another part of this example, the needle maintains a substantially linear configuration as it extends outside of the base.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein:

FIG. 5 is a schematic section view of the patch pump system of FIG. 1;

Corresponding reference numerals are used to indicate corresponding parts throughout the several views.

DETAILED DESCRIPTION

The embodiments of the present disclosure described below are not intended to be exhaustive or to limit the disclosure to the precise forms in the following detailed description. Rather, the embodiments are chosen and described so that others skilled in the art may appreciate and understand the principles and practices of the present disclosure.

Figure 1:
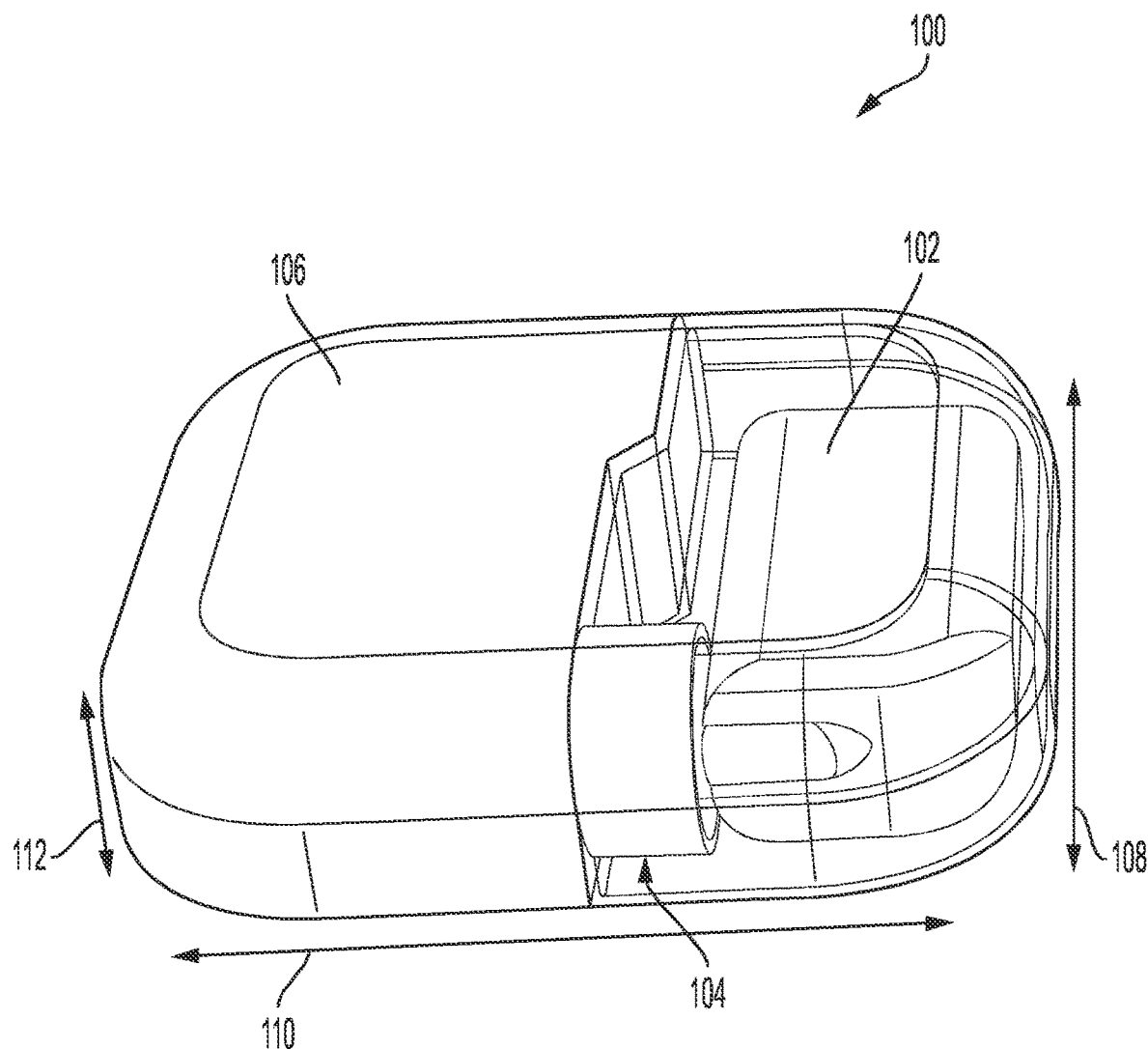
FIG. 1 is an elevated perspective view of a patch pump system.

Referring to FIG. 1, one embodiment of a patch pump system 100 is illustrated. The patch pump system 100 may have a reservoir 102 that provides fluid to an infusion assembly having an inserter 104. Further, an electronic assembly 106 may be part of the patch pump system 100 to control the distribution of fluid from the reservoir 102 into components of the patch pump system 100 as discussed in more detail here.

Figure 2:
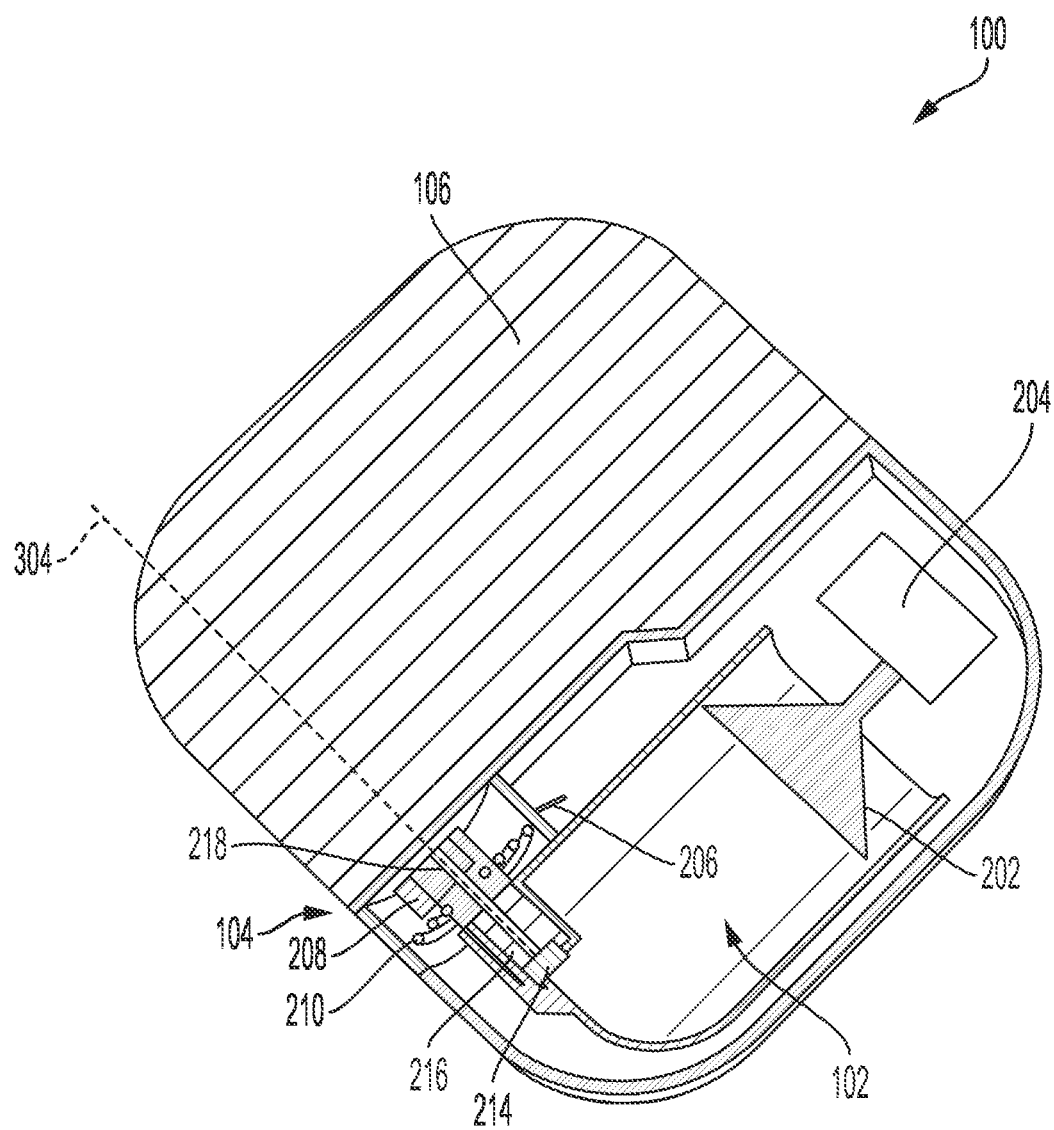
FIG. 2 is a section view of the patch pump system of FIG. 1.
Figure 3:
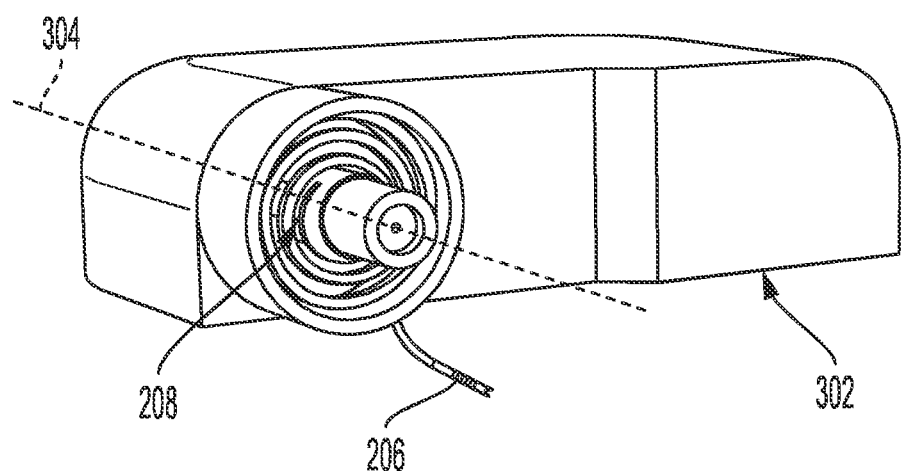
FIG. 3 is another section view of the patch pump system of FIG. 1.

More specifically with reference to the section view of the patch pump system in FIGS. 2 and 3, the reservoir 102 may have a piston 202 or the like therein to selectively apply a pressure to the fluid in the reservoir 102. The piston 202 may be connected to a motor and gear assembly 204 to selectively actuate the piston 202 to move axially through the reservoir 102. This motor and gear assembly 204 may be powered and controlled by components from the electronic assembly 106. For example, the electronic assembly 106 may have a power source such as a battery therein and a controller having a processor and a memory unit. The controller may selectively power the motor and gear assembly 204 to move the piston 202 through the reservoir 102. In this configuration, the electronic assembly can dose any fluid in the reservoir 102 at predetermined rates or cycles.

While a motor and gear assembly is discussed herein, other embodiments considered herein may not have a motor and gear assembly but rather utilize a spring or the like to transition the piston 202. Alternatively, the motor may directly drive the piston 202 and not have a gear assembly at all in one embodiment considered herein.

Figure 4A:
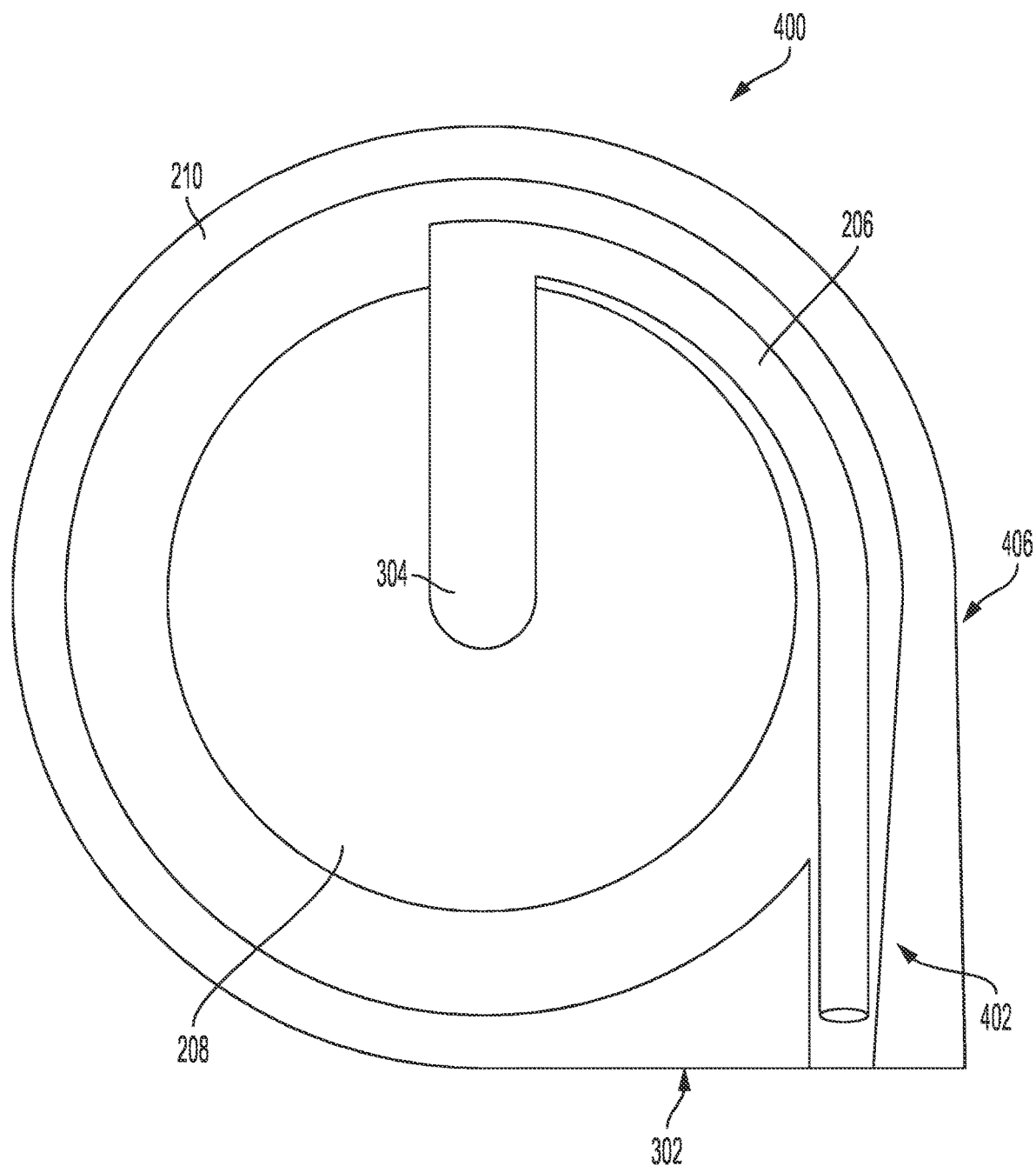
FIG. 4a is a schematic view of an inserter of the patch pump system of FIG. 1 in the retracted configuration.
Figure 4B:
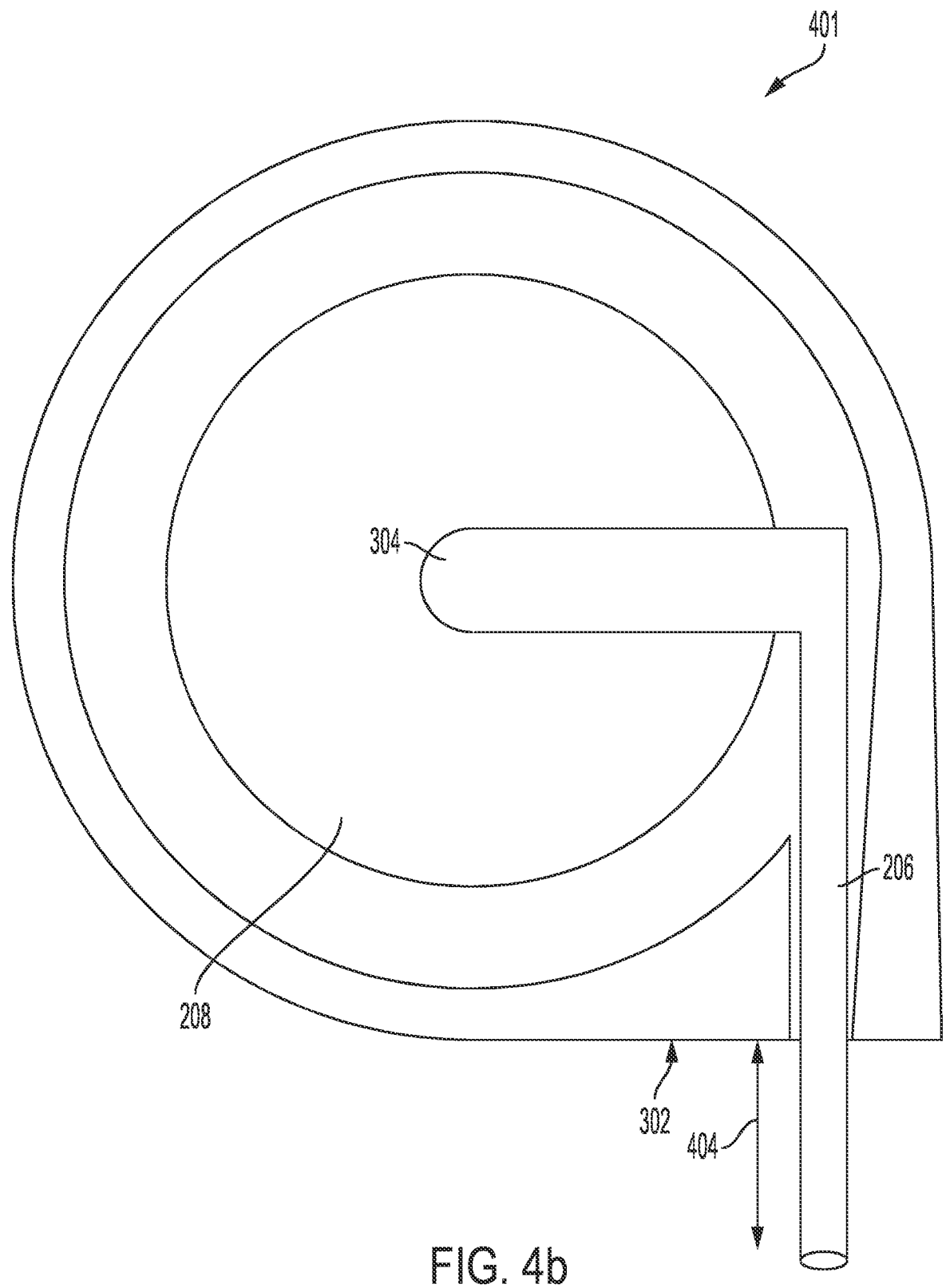
FIG. 4b is a schematic view of an inserter of the patch pump system of FIG. 1 in the extended configuration.

A portion of the reservoir 102 may be fluidly coupled to the inserter 104 to distribute fluid from the reservoir 102 out of a needle 206. The inserter 104 may selectively transition the needle 206 from a retracted position 400 (see FIG. 4a) wherein the needle is substantially housed within the inserter 104 to an extended position 401 (see FIG. 4b) wherein the needle 206 extends from a base plane along a base surface 302 of the patch pump system 100. More specifically, the inserter 104 may have an inner part 208 that rotates relative to a housing 210 of the inserter 104 about a rotation axis 304. The rotation axis 304 may be substantially parallel to the base plane of the base surface 302. Further, the inner part 208 may have a fluid channel 212 that is fluidly coupled to the reservoir 102. The fluid channel 212 directs fluid from the reservoir 102 through the inserter 104 and into the needle 206 to be exhausted out of a distal portion of the needle 206 when the piston 202 applies sufficient pressure to the fluid in the reservoir 102.

In one aspect of this disclosure, a valve 214 may be positioned at least partially between the fluid channel 212 and the reservoir 102. The valve 214 may be a one-way valve wherein fluid can pass from the reservoir 102 into the fluid channel 212 but not from the fluid channel 212 back into the reservoir 102. Among other things, this may prevent contaminated fluid from entering the reservoir 102. Further, the reservoir 102 may be removable from the remaining components of the patch pump system 100. In this configuration, when the fluid of the reservoir 102 in the patch pump system 100 is depleted, the depleted reservoir may be removed and a full reservoir may be fluidly coupled to the inserter 104 as a replacement.

Figure 7A:
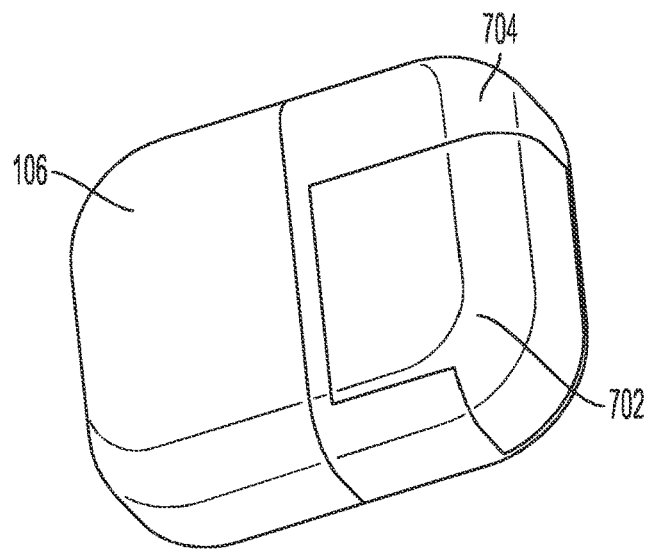
FIGS. 7a-7c illustrate one embodiment wherein a reservoir is removable from a patch pump system.
Figure 7B:
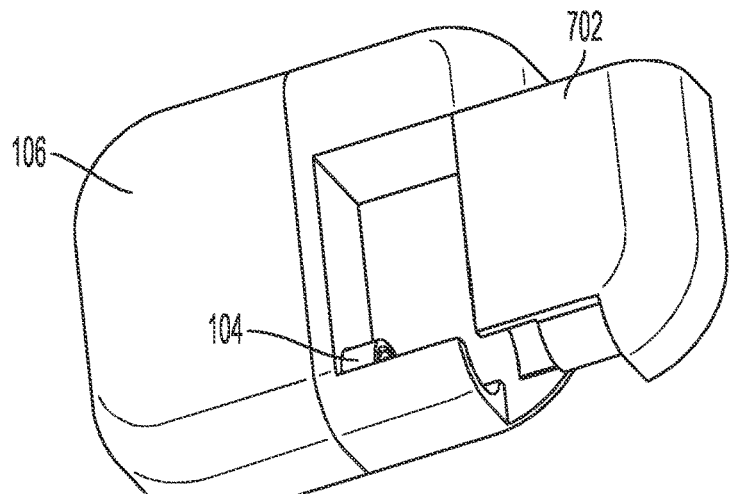
Figure 7C:
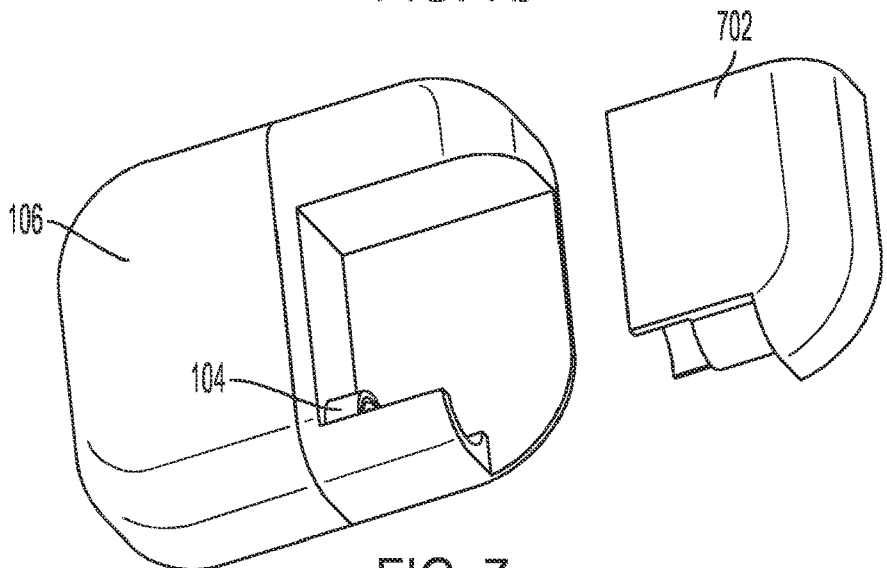

One embodiment of a removable reservoir 702 is illustrated in FIGS. 7a-7c. More specifically, the reservoir 702 may be removably coupled to a patch housing 704 such that it may slide into, and out of, fluid connection with the inserter 104. The patch housing 704 may define a receiving portion that corresponds with the reservoir 702 to allow the reservoir 702 to slide into, and out of fluid coupling with the inserter 104. In the fluidly coupled position, the reservoir 702 may have a latch or the like that locks the reservoir 702 into the fluidly coupled position with the inserter 104. However, when the reservoir 702 is depleted, the user may disengage the latch to remove the reservoir 702 from the patch housing 704. Then, a reservoir full of fluid may be subsequently coupled thereto for further use. In one aspect of this embodiment, a substantially circular seal may be positioned about the fluid channel 212 between the removable reservoir 702 and the inserter 104 to ensure the fluid channel 212 is substantially sealed at the interchange between the removable reservoir 702 and the inserter 104 when the removable reservoir 702 is latched to the patch housing 704.

In another aspect of this disclosure, a filter 216 may be positioned along the fluid channel 212. The filter 216 may filter phenol and meta-cresol residuals from the fluid flowing from the reservoir 102 to the needle 206 among other things. However, other types of filters for filter 216 are also contemplated herein.

The inserter 104 may also have a valve 218 positioned between the inner part 208 and the needle 206. Similar to the valve 214, valve 218 may also be a one-way valve that substantially prevents the backflow of fluid back into the reservoir 102 from the needle 206. Embodiments considered herein may have only one of the valves 214, 218 and not the other. Alternatively, one embodiment considered herein has both valves 214, 218 positioned as discussed and illustrated herein.

The inner part 208 may be coupled to the needle 206 such that rotation of the inner part 208 moves the needle 206 between the retracted position 400 and the extended position 401. The inner part 208 may be coupled to the needle 206 such that rotation of the inner part 208 relative to the housing 210 about the rotation axis 304 transitions the needle along an insertion guide channel 402 within an insertion angle component 406 before extending past the base surface 302. More specifically, the needle 206 may be formed of a material that has material properties such that the needle 206 can elastically deform within the inserter 104. The needle 206 may typically have a substantially linear configuration but the elastic properties of the needle 206 may allow the needle 206 to bend along the inner surface of the housing 210 when in the retracted position.

This arc-shaped elastic deformation of the needle 206 allows the inserter 104 and corresponding patch-pump system 100 to have a low profile (i.e., thickness 112) because it allows the needle 206 to achieve a desired extended depth 404 past the base surface 302 in the extended position 401 without requiring additional axial clearance for the needle to achieve the retracted position 400. In one example, the extended depth 404 may be about four millimeters. However, in other embodiments considered herein the extended depth 404 may be greater than four millimeters or less than four millimeters. Further, the degree to which the inner part 208 rotates may alter the extended depth 404 of the needle 206. In one aspect of this disclosure, the degree of rotation of the inner part 208 may be controlled by the electronic assembly 106 to alter the extended depth 404.

In other words, a substantially straight needle typically moves axially along a longitudinal axis of the needle to transition between the retracted and extended position. This requires enough axial space along the longitudinal axis of the needle to allow the needle to maintain the retracted position. By implementing the bending needle 206 configuration discussed herein, the needle 206 may partially bend along the housing 210 in the retracted position 400 to reduce the required thickness 112 of the patch-pump system 100 while still achieving the same extended depth 404 as the prior art designs.

The insertion guide channel 402 may be formed in the insertion angle component 406 that may be part of the housing 210. The insertion guide channel 402 may have any desired angular orientation relative to the base surface 302, which is intended to be positioned on the skin of the user. While the embodiments illustrated in FIGS. 4a and 4b primarily show the needle 206 extending substantially perpendicularly from the base surface 302, other embodiments may extend the needle 206 at about thirty degrees from the base surface 302. Alternatively, other embodiments considered herein may utilize an insertion guide channel 402 that directs the needle 206 to extend at an angle that is greater than thirty degrees but less than ninety degrees relative to the base surface 302. Further still, other embodiments may utilize an insertion guide channel 402 that directs the needle 206 to extend at an angle that is less than thirty degrees.

Figure 4C:
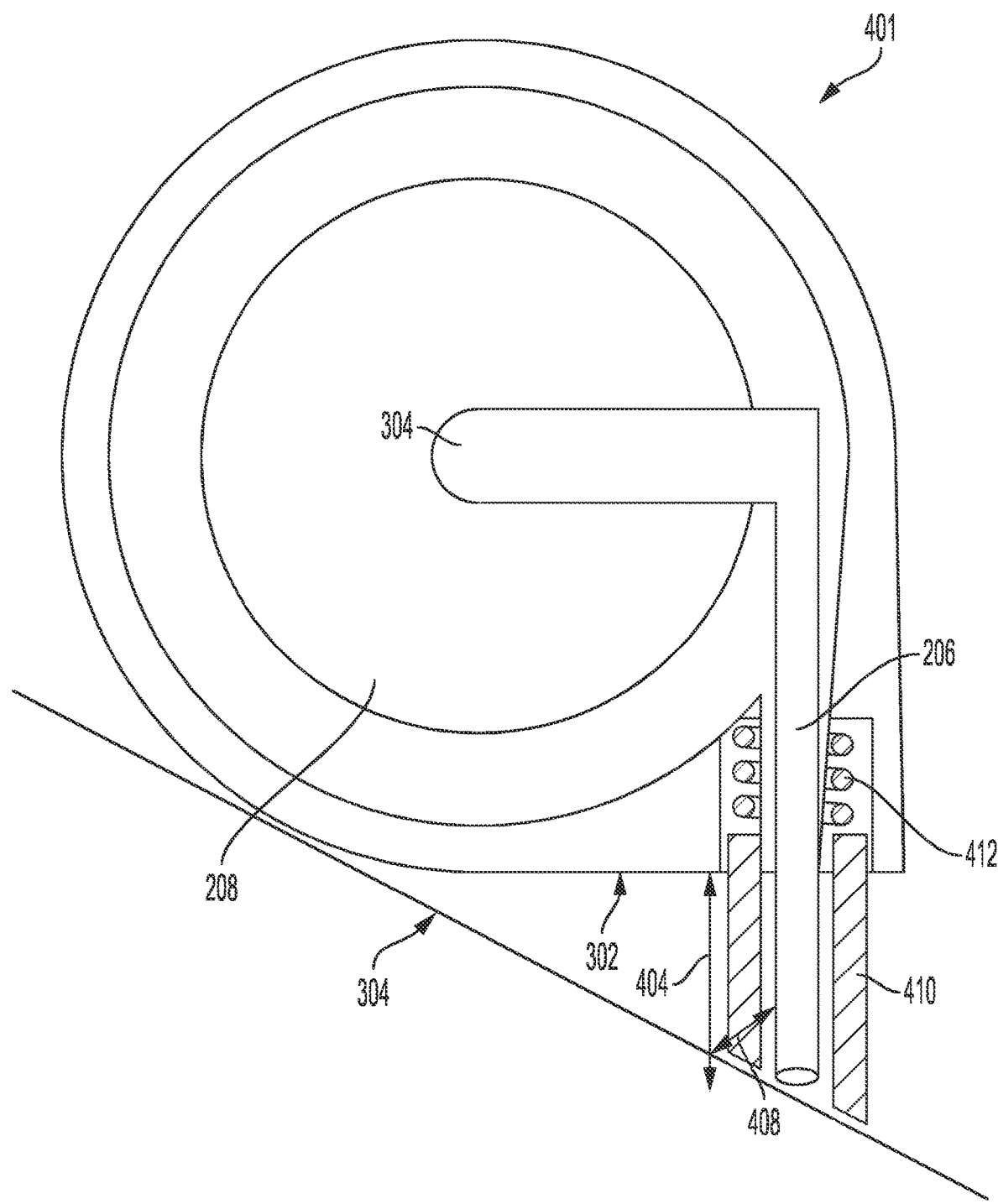
FIG. 4c is a schematic view of an inserter of the patch pump system of FIG. 1 having an adjustable insertion angle.

In one aspect of this disclosure illustrated in FIG. 4c, the inserter 104 may be pivotal within the patch pump system 100 to alter an insertion angle 408 of the needle 206 relative to the base surface 302 of the patch pump system 100. This allows the user or medical professional to select and insertion angle 408 that is ideal for the user. The needle 206 may have a sleeve 410 that is extendable along the needle 206 to ensure the needle 206 extends past the base surface 302 in a substantially linear configuration. The sleeve 410 may have a spring 412 positioned axially about the needle 206 between the sleeve 410 and the inserter 104. In this configuration, when the insertion angle 408 is about ninety degrees, the sleeve 410 may compress the spring 412 and be positioned substantially within a cavity of the inserter 104. However, when the insertion angle 408 is less than ninety degrees, the sleeve 410 may at least partially extend out of the cavity as the spring 412 provides a bias towards the base surface 302 to thereby ensure the sleeve 410 provides a channel for the needle 206 to be further inserted into the user.

In yet another aspect of this embodiment, the electronic assembly 106 may control the insertion angle 408. More specifically, the inserter 104 and housing 210 may be rotatable relative to the electronic assembly 106 to alter the insertion angle 408 as discussed herein. Further, a motor or the like may selectively rotate the inserter 104 through the housing 210 to alter the insertion angle 408. In this configuration, the electronic assembly 106 may selectively alter the insertion angle 408 by selectively rotating the inserter 104 via the motor.

Figure 8A:
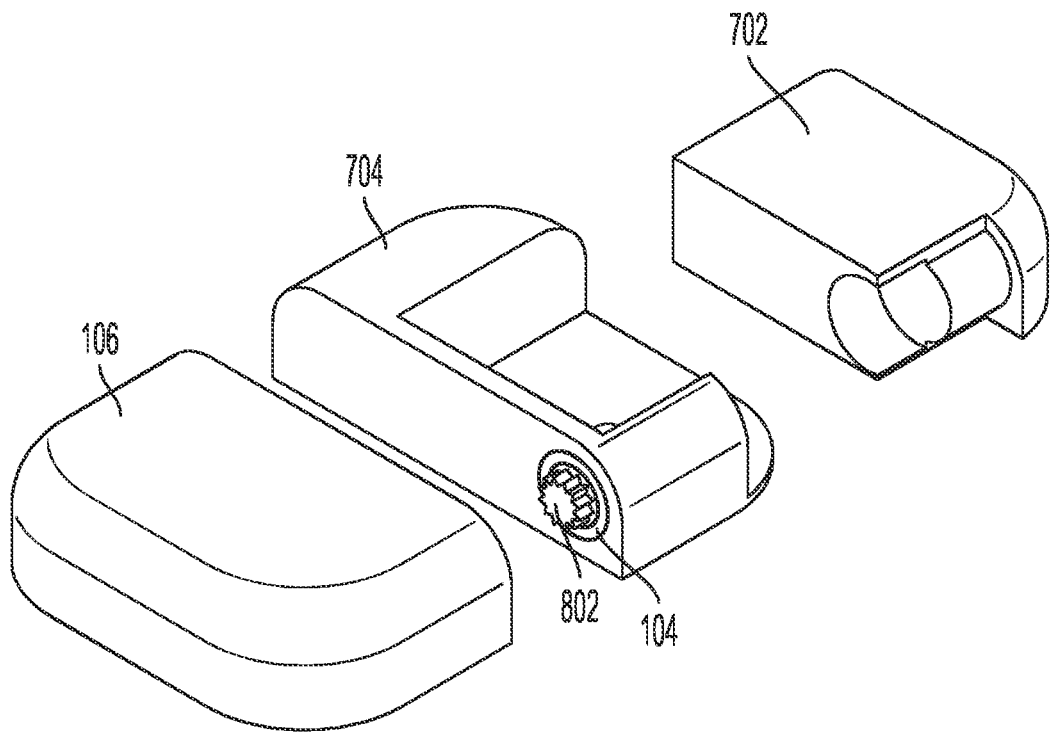
FIGS. 8a-8b illustrate one embodiment of a geared motor assembly for an inserter.
Figure 8B:
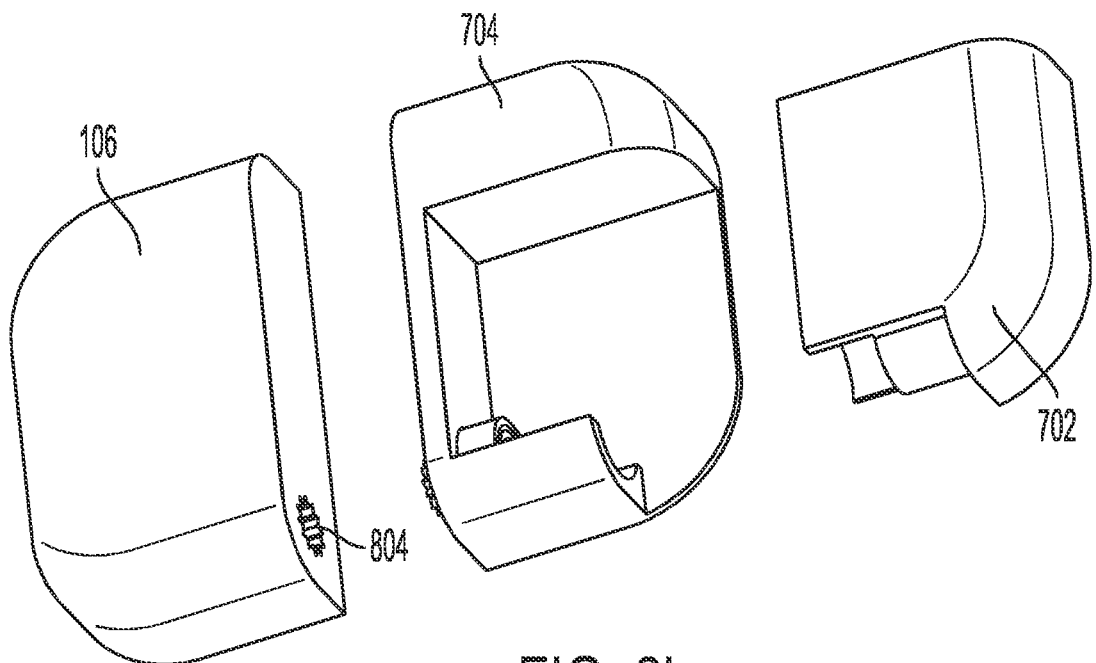

Referring now to FIG. 5, a schematic section view 500 of the patch-pump system 100 is illustrated. More specifically, a motor 502 is illustrated as part of the electronic assembly 106. The motor 502 has a shaft coupled to the inner part 208 of the inserter 104. Further, the motor 502 may be selectively powered by the controller of the electronic assembly 106. Alternatively, the motor 502 may be selectively powered by a user input. Regardless, the motor 502 may be powered to rotate the inner part 208 and the needle 206 between the retracted position 400 and the extended position 401. Further, in one embodiment contemplated herein the motor 502 may be coupled to a gear assembly 802, 804 (see FIGS. 8a and 8b) to selectively rotate the inner part 208. Further still, the gear assembly 802, 804 may be a planetary gear assembly or any other type of gear assembly known in the art.

Figure 6A:
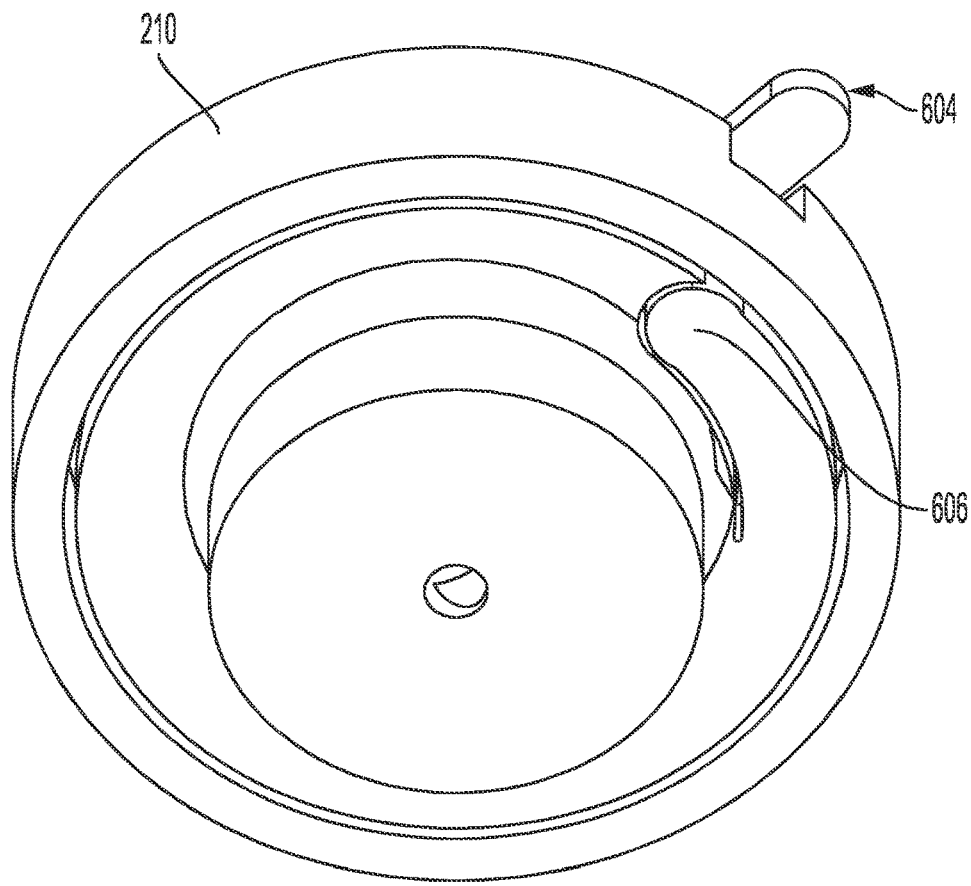
FIGS. 6a and 6b illustrate one embodiment of this disclosure utilizing a spring to extend a needle to an extended position.
Figure 6B:
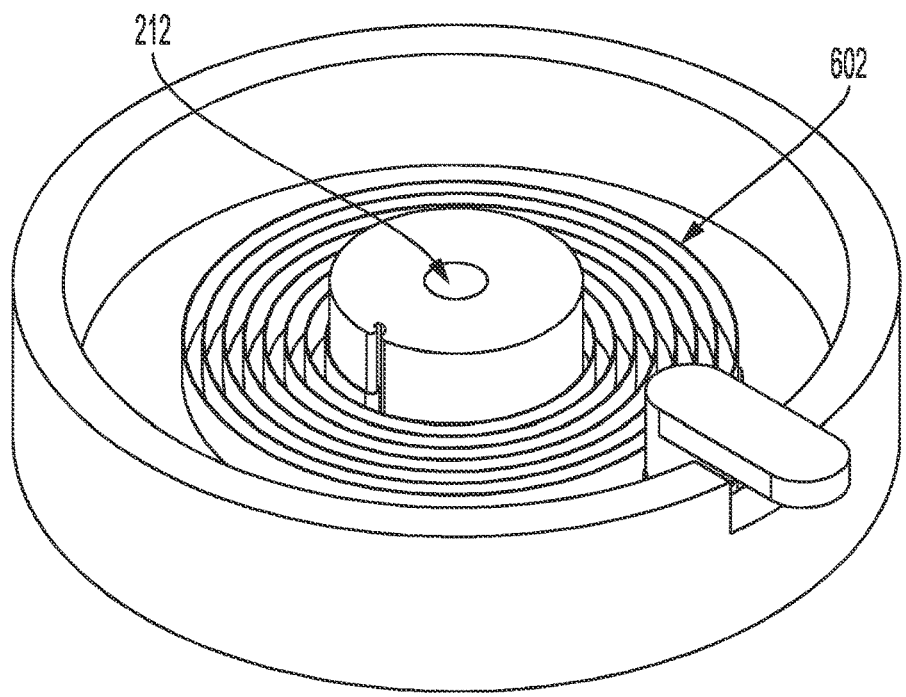

In another embodiment of this disclosure illustrated in FIGS. 6a and 6b, the inner part 208 may have a mechanical assembly configured to transition the needle 206 from the retracted position 400 to the extended position 401. More specifically, a spring 602 may be positioned to provide a bias on the inner part 308 relative to the housing 210 towards the extended position 401. The inner part 308 may be locked in the retracted position with an activator 604 and lock pin 606. The activator 604 may be engaged by a user to release the inner part 208 to rotate to the extended position 401 due to the bias applied by the spring 602.

The fluid channel 212 may transition to the inner part 208 along the rotation axis 304. With this configuration, the fluid channel 212 of the inner part 208 may remain fluidly coupled to the reservoir 102 through the fluid channel regardless of the angular orientation of the inner part 208 (i.e., regardless of whether the needle 206 is in the retracted position 400 or the extended position 401). In one aspect of this disclosure, a seal may be positioned between the inner part 208 and the reservoir 102. The seal may be circularly positioned about the fluid channel 212 at the interchange between the inner part 208 and the reservoir 102. Positioning the seal at this location may ensure the fluid in the fluid channel 212 is directed to the needle 206 from the reservoir 102.

In one aspect of this disclosure, the inserter 104 utilizing the bending needle 206 provides an overall patch pump system 100 that is significantly smaller than the prior art patch pump systems. More specifically, the patch pump system 100 may have a length 108, width 110, and thickness 112 that results in a miniature patch pump system compared to the prior art devices. In one example, the width 110 is less than fifty-six millimeters, the length 108 is less than forty-one millimeters, and the thickness is less than fourteen and one-half millimeters. In another example, the width 110 is less than forty-nine millimeters, the length 108 is less than thirty-nine millimetres, and the thickness is less than twelve millimeters. In yet another example, the width 110 is about forty-one millimeters, the length 108 is about thirty-six millimeters, and the thickness is about ten millimeters.

In use, the patch-pump system 100 may have an adhesive or the like on the base surface 302. Alternatively, the patch-pump system 100 may have an adhesive element that extends over at least a portion of the patch-pump system 100. Regardless, the patch-pump system 100 may be coupled to a user's skin so the base surface 302 is adjacent to the user's skin. The patch-pump system 100 may be coupled to the user while the needle 206 is in the retracted position 400. Further, the reservoir 102 may have at least some fluid therein ready to be administered to the user. Once the patch-pump system 100 is coupled to the user, the electronic assembly 106 may transition the needle 206 from the retracted position 400 to the extended position 401 with the inserter 104. This extends the distal tip of the needle 206 subcutaneously into the user. The inserter 104 may initiate the insertion process through a user input to the electronic assembly 106 or directly to the motor 502. Alternatively, the inserter may be manually engaged to transition the needle 206 to the extended position 401. Once the needle 206 is in the extended position, the electronic assembly 106 may selectively engage the motor and gear assembly 204 to provide a set dose of the fluid in the reservoir 102 to the user through the needle 206 by selectively actuating the piston 202.

Once the user is prepared to remove the patch-pump system 100, the inserter 102 may transition the needle 206 to the retracted position 400 either through the electronic assembly 106 or by manually engaging the inserter 102. Once the needle 206 is in the retracted configuration 400, the adhesive holding the patch pump 100 to the user may be removed or the patch pump may be otherwise peeled from the user's skin.

While embodiments incorporating the principles of the present disclosure have been described hereinabove, the present disclosure is not limited to the described embodiments. Instead, this application is intended to cover any variations, uses, or adaptations of the disclosure using its general principles. Further, this application is intended to cover such departures from the present disclosure as come within known or customary practice in the art to which this disclosure pertains and which fall within the limits of the appended claims.

The invention claimed is:

1. A patch pump system, comprising:
an electronic assembly;
a reservoir for containing a fluid; and
an inserter for selectively transitioning a needle from a retracted position to an extended position, the inserter providing a fluid channel that selectively fluidly couples a distal tip of the needle to the reservoir;
wherein, the needle is at least partially deformed as it transitions from the retracted position to the extended position and the electronic assembly selectively distributes fluid from the reservoir to the distal tip of the needle;
wherein the reservoir has a base surface configured to be coupled to a user, the base surface defining a base plane;
wherein, the inserter has an inner part that rotates about a rotation axis that is substantially parallel to the base plane to transition the needle from the retracted position to the extended position.

2. The patch pump system of claim 1, further comprising a filter positioned between the reservoir and the distal tip of the needle, wherein the filter at least partially filters one or more of phenol and meta-cresol residuals from fluid passing there through.

3. The patch system of claim 1, wherein the patch system is less than forty-nine millimeters wide by thirty-nine millimeters deep and twelve millimeters thick.

4. The patch system of claim 3, wherein the patch system is less than about forty-one millimeters wide by about thirty-six millimeters deep and about ten millimeters thick.

5. The patch system of claim 1, further comprising a valve positioned between the distal tip of the needle and the reservoir, wherein the valve is a one-way valve allowing fluid to flow from the reservoir to the distal end of the needle.

6. The patch system of claim 1, wherein the reservoir is removable from the electronic assembly and inserter.

7. The patch system of claim 1, further wherein the electronic assembly selectively transitions the needle between the retracted position to the extended position.

8. The patch system of claim 1, further comprising:
an inner part configured to selectively transition the needle from the retracted position to the extended position, and
an insertion angle component;
wherein, as the inner part transitions from the retracted position to the extended position, the needle is at least partially deformed by the insertion angle component.

9. The patch system of claim 8, further wherein the needle is elastically deformed to fit within the inserter in the retracted position and deflects through contact with the insertion angle component as the needle transitions from the retracted position to the extended position.

10. The patch system of claim 9, further wherein the needle maintains a substantially linear configuration as it extends outside of the base.

11. A patch pump system, comprising:
an electronic assembly;
a reservoir for containing a fluid;
an inserter for selectively transitioning a needle from a retracted position to an extended position, the inserter providing a fluid channel that selectively fluidly couples a distal tip of the needle to the reservoir;
a filter positioned in-line with the fluid channel between the reservoir and the distal tip of the needle and a first one-way valve positioned along the fluid channel between the filter and the reservoir; and
a second one-way valve positioned along the fluid channel between the distal end of the needle and the filter;
wherein, the needle is at least partially deformed as it transitions from the retracted position to the extended position and the electronic assembly selectively distributes fluid from the reservoir to the distal tip of the needle.

12. A patch pump system, comprising:
an electronic assembly;
a reservoir for containing a fluid; and
an inserter for selectively transitioning a needle from a retracted position to an extended position, the inserter providing a fluid channel that selectively fluidly couples a distal tip of the needle to the reservoir;

wherein, the needle is at least partially deformed as it transitions from the retracted position to the extended position and the electronic assembly selectively distributes fluid from the reservoir to the distal tip of the needle;

wherein the electronic assembly selectively controls an extension length of the needle.

13. The patch system of claim 12, further wherein the electronic assembly selectively controls an insertion angle of the needle.

* * * * *